United States Patent
Wei et al.

(10) Patent No.: US 10,354,625 B2
(45) Date of Patent: Jul. 16, 2019

(54) DIGITAL SIGHT-SINGING PIANO WITH A FIXED-SOLFÈGE KEYBOARD, CONTINUOUS KEYS AND ADJUSTABLE TONES BY KNEADING PIANO KEYS

(71) Applicant: GUANGZHOU PHONPAD INFORMATION TECHNOLOGY COOPERATION LIMITED, Guangzhou, Guangdong Province (CN)

(72) Inventors: Gang Wei, Guangzhou (CN); Yan Cao, Guangzhou (CN); Cui Yang, Guangzhou (CN); Yige Wang, Guangzhou (CN)

(73) Assignee: GUANGZHOU PHONPAD INFORMATION TECHNOLOGY CORPORATION LIMITED, Guangzhou, Guangdong Province (CN)

( * ) Notice: Subject to any disclaimer, the term of this patent is extended or adjusted under 35 U.S.C. 154(b) by 0 days.

(21) Appl. No.: 15/987,738

(22) Filed: May 23, 2018

(65) Prior Publication Data
US 2018/0342228 A1 Nov. 29, 2018

(30) Foreign Application Priority Data
May 23, 2017 (CN) .......................... 2017 1 0368711

(51) Int. Cl.
*G10H 1/02* (2006.01)
*G10G 1/02* (2006.01)
(Continued)

(52) U.S. Cl.
CPC .............. *G10G 1/02* (2013.01); *G09B 15/023* (2013.01); *G09B 15/04* (2013.01); *G10H 1/0008* (2013.01);
(Continued)

(58) Field of Classification Search
CPC ......... G10G 1/02; G09B 15/023; G09B 15/04
See application file for complete search history.

(56) References Cited

U.S. PATENT DOCUMENTS 3,023,659 A * 3/1962 Bode ..................... G10H 1/20
84/445
3,030,848 A * 4/1962 Wick ..................... G10C 3/28
200/11 D
(Continued)

*Primary Examiner* — Robert W Horn
(74) *Attorney, Agent, or Firm* — Muncy, Geissler, Olds & Lowe, P.C.

(57) ABSTRACT

A digital sight-singing piano is disclosed with a fixed-solfège keyboard, continuous keys and adjustable tones by kneading piano keys, wherein the key can be varied continuously and the frequency of a piano key can be slightly adjusted by kneading the piano key during playing. The keyboard of the digital sight-singing piano has fixed solfège, wherein no matter what key is used for playing, the piano keys in a solfège key set always have the same correspondence to the solfège syllables of the numbered musical notation in one octave. A color graphic vector numbered musical notation is also disclosed, wherein extended solfège is used to describe pitch, different colors are used to indicate the positions of the piano keys to press, notation frames with fixed width are used to represent the beat unit, and font (i.e., bold or not) of musical notes are used to show the strength of pressing piano keys. The color graphic vector numbered musical notation is suitable for computer-aided notation. It can be exhibited in several different types and provide multi-dimension playing information. The color graphic vector numbered musical notation can also be combined with the fixed-solfège keyboard to facilitate sight-singing and make it easy to learn to play the piano.

9 Claims, 10 Drawing Sheets

(51) Int. Cl.
*G09B 15/02* (2006.01)
*G09B 15/04* (2006.01)
*G10H 1/34* (2006.01)
*G10H 1/00* (2006.01)
*G10H 1/44* (2006.01)

(52) U.S. Cl.
CPC .......... *G10H 1/0016* (2013.01); *G10H 1/344* (2013.01); *G10H 1/44* (2013.01); *G10H 2210/395* (2013.01); *G10H 2210/471* (2013.01); *G10H 2210/541* (2013.01); *G10H 2220/096* (2013.01); *G10H 2220/116* (2013.01)

(56) References Cited

U.S. PATENT DOCUMENTS

| | | | | |
|---|---|---|---|---|
| 3,141,371 A * | 7/1964 | Coles | G10C 3/12 | 84/1 |
| 3,674,907 A * | 7/1972 | Derry | G10H 1/20 | 84/445 |
| 3,865,004 A * | 2/1975 | Coles | G09B 15/08 | 192/134 |
| 3,986,422 A * | 10/1976 | Coles | G10C 3/12 | 84/678 |
| 4,048,893 A * | 9/1977 | Coles | G10C 3/12 | 84/445 |
| 4,498,363 A * | 2/1985 | Shimada | G10H 5/06 | 84/451 |
| 4,640,173 A * | 2/1987 | Coles | G10H 1/0008 | 84/442 |
| 4,821,619 A * | 4/1989 | Coles | G10H 1/0008 | 84/448 |
| 4,899,631 A * | 2/1990 | Baker | G10H 1/053 | 84/433 |
| 4,903,571 A * | 2/1990 | Coles | G10G 1/02 | 84/442 |
| 4,903,572 A * | 2/1990 | Coles | G10G 1/02 | 84/442 |
| 5,129,303 A * | 7/1992 | Coles | G10H 1/0008 | 84/442 |
| 6,703,552 B2 * | 3/2004 | Haken | G10H 1/0555 | 84/423 R |
| 7,674,965 B2 * | 3/2010 | Mataele | G09B 15/023 | 84/483.2 |
| 7,723,597 B1 * | 5/2010 | Tripp | G10H 1/344 | 84/423 R |
| 8,952,232 B2 * | 2/2015 | Parsons | G10C 3/12 | 84/429 |
| 9,029,678 B2 * | 5/2015 | Ye | G10G 1/02 | 84/478 |
| 9,183,755 B2 * | 11/2015 | Shi | G09B 15/023 | |
| 10,002,542 B1 * | 6/2018 | Jenkins | G10G 1/02 | |
| 2004/0216584 A1 * | 11/2004 | Audigane | G09B 15/02 | 84/470 R |
| 2011/0252946 A1 * | 10/2011 | Armstrong | G09B 15/023 | 84/483.2 |
| 2018/0342228 A1 * | 11/2018 | Wei | G09B 15/023 | |

* cited by examiner

Numbered musical notation:

Color graphic vector numbered musical notation:

1 = C

Annotation:

Vary the beat unit:

500 Miles

500 Miles

DIGITAL SIGHT-SINGING PIANO WITH A FIXED-SOLFÈGE KEYBOARD, CONTINUOUS KEYS AND ADJUSTABLE TONES BY KNEADING PIANO KEYS

FIELD OF THE INVENTION

The present invention relates generally to a keyboard musical instrument and a musical notation method. More specifically it relates to a digital musical instrument apparatus that facilitates sight singing based on a keyboard with fixed solfège and enables the player to change keys continuously during playing and adjust tones by kneading piano keys.

BACKGROUND

Keyboard musical instruments generally refer to pianos, digital pianos, and so on. For a traditional piano, each piano key is connected to a hammer covered with felt. When a player presses a piano key, the hammer strikes the string, causing it to vibrate to produce the sound. In this case, the sound is produced using mechanical devices. The digital piano is evolved from the traditional piano. When a piano key is pressed, the corresponding stored sound source is sent to the amplifier after being processed and finally arrives at the speaker to produce the sound. In this case, the sound is produced by electronic devices.

Since the traditional piano makes a sound through mechanical devices, each piano key on the keyboard has a fixed frequency, i.e., a fixed pitch. Pitch is the quality that allows people to classify a sound as relatively high or low. Pitch is a basic feature of the sound and it is determined by the frequency of sound wave vibrations. The higher the frequency, the higher the pitch, and vice versa. To adjust the pitch of a piano key for the traditional piano, professional piano tuners need to adjust the mechanical devices accordingly. For digital pianos, since the sound is produced by electronic devices, the sound source decides what the sound is like as long as the sound source is within the passband of the speaker. Therefore, the pitch of a piano key is adjustable for digital pianos.

A piano keyboard has 52 white keys and 36 black keys, totaling to 88 keys, which include seven octaves plus a minor third (from A0 to C8). Each octave has 12 keys including 7 white keys and 5 black keys, which correspond to the twelve notes of a musical scale according to the twelve-tone equal temperament. For the middle octave, the seven white keys are named "C, D, E, F, G, A, B" and the five black keys are named "C#, D#, F#, G#, A#". Since the frequency ratio of two notes an octave apart is 2:1, the frequency ratio of two adjacent notes in an octave is $2^{1/12}$, i.e., each octave is divided into 12 parts, all of which are equal on a logarithmic scale. Based on this principle, the frequency range of the piano keyboard extends from 27.5 Hz to 4186 Hz and the pitch of a piano key is derived by multiplying (ascending) that of the previous key by $2^{1/12}$. Then the strings are designed to produce sound with the frequencies of the corresponding piano keys. In the numbered musical notation, an octave has only seven music notes with the notation of "1, 2, 3, 4, 5, 6, 7" and their solfège syllables are "do, re, mi, fa, sol, la, si", respectively. Therefore, the relationship between the twelve piano keys in an octave of the piano keyboard and the seven solfège syllables is not fixed, i.e., a piano key does not have a fixed solfège syllable. Which piano key corresponds to "do" (the digit "1") is determined by the key of a piece. As long as the key is chosen for a piece, there is a one-to-one relationship between the twelve piano keys in an octave of the piano keyboard and the seven solfège syllables. For example, if the key is the C major scale, the key signature is defined as "1=C" and the seven notes of the C major scale "C, D, E, F, G, A, B" correspond to "do, re, mi, fa, sol, la, si", respectively. When "1=F#", the key is the F# major scale and the seven notes of the F# major scale "F#, G#, A#, B, C#, D#, F" correspond to "do, re, mi, fa, sol, la, si", respectively. Obviously, the solfège syllable of a piano key is not fixed. Since any piano key in an octave of the piano keyboard can be "do", there are twelve possible keys for a piece.

A digital piano is an electronic device, where the frequency of the sound is adjustable. So the key can be changed easily and this is referred to as "key change with one button". When the key is changed, a piano key still corresponds to the same solfège syllable, which is one of the main features of digital pianos. Moreover, digital pianos have multiple timbres and can imitate the sound of many instruments. A digital piano has at least dozens of and sometimes even hundreds of timbres. The richness of timbres is another main feature of digital pianos. To choose a timbre, we just need to press the corresponding button in the timbre control section on the front panel. The timbres of a digital piano include two categories, common timbres and special timbres. The common timbres are used to imitate the sound of common instruments, while the special timbres are for imitating the natural sounds and imagined timbres. Temperament in music includes the twelve-tone equal temperament, the temperament based on the five-element theory, just intonation, etc. For different temperaments, the frequency ratio of two adjacent solfège syllables is different. Since digital pianos can adjust the frequency of the sound, they can support multiple temperaments. However, since digital pianos are originally invented to imitate traditional pianos, they are basically designed based on traditional pianos and only have twelve fixed keys. The function of "key change with one button" is seldom used. Moreover, after the key, timbre and temperament are chosen, the sound of a piano key is fixed and the players are given few opportunities to improvise, which leads to poor interaction. If the players can slightly adjust the frequency of a piano key during playing, just like vibrato in string instruments, then they will have more room for creation.

The numbered musical notation and the staff notation are two most popular musical notation systems. The numbered musical notation is a simple notation system, where numbers 1 to 7 are used to represent the musical notes and are respectively called "do, re, mi, fa, sol, la, si". The number "0" represents the musical rest. In the numbered musical notation, solfège syllables are octave-repeating. For example, high "do" is an octave higher than "do" ("1") and it begins a cyclic repetition with a higher pitch. The numbers in the numbered musical notation are referred to as solfège digits in this invention. The numbered musical notation can facilitate recording musical notes by hand and sight singing. However, it cannot describe some elements of a piece, such as dynamics, etc. The staff notation is currently the most common musical notation method in the world. It is a set of 5 horizontal lines and 4 spaces that each represent a different musical pitch. Compared with the numbered musical notation, it is much easier to visualize the essential musical elements, such as pitch, duration, time signature, tempo, dynamics, clef, etc., on the staff notation. However, the staff notation is not designed based on solfège syllables and is not suitable for sight singing.

In summary, for a traditional piano, a piano key has a fixed pitch and does not correspond to a fixed solfège syllable; for a digital piano, a piano key can have a fixed solfège syllable and its pitch is adjustable, but it is still impossible to play in an arbitrary key and the frequency of a piano key cannot be slightly adjusted during playing. For musical notation systems, the numbered musical notation is not suitable for playing and the staff notation cannot facilitate sight singing. If the advantages of these two notation systems can be combined and the elements of playing are added to the numbered musical notation, then reading music notation will become much easier and in the meantime all the musical elements are represented precisely. Furthermore, if a piano based on a keyboard with fixed solfège is provided, then it will be no longer difficult to learn to play the piano.

SUMMARY OF THE INVENTION

The present invention seeks to provide solutions to the problems described in the preceding Background section by providing a digital sight-singing piano with a fixed-solfège keyboard, continuous keys and adjustable tones by kneading piano keys. The key can be varied continuously and the frequency of a piano key can be slightly adjusted during playing, which further adjusts temperament and timbre. The keyboard has fixed solfège, which means no matter what key is used for playing, the piano keys always correspond to the same solfège syllables. Another embodiment of the present invention provides a color graphic vector numbered musical notation, which not only extends the solfège syllables but also offers multi-dimension information of playing. When the color graphic vector numbered musical notation is combined with the fixed-solfège keyboard, novices can learn to play the piano by using sight singing.

A digital sight-singing piano with a fixed-solfège keyboard, continuous keys and adjustable tones by kneading piano keys includes a sound source module, a solfège keyboard, a key-temperament-timbre adjustment module, and a sound play module. The sound source module is responsible for collecting and storing sound sources of all kinds of musical instruments and sets up a sound source database. The solfège keyboard sends instructions to the sound source module and the key-temperament-timbre adjustment module according to the buttons pressed. The key-temperament-timbre adjustment module edits the sound source and generates a new sound file according to the received instructions. The sound play module is responsible for playing the sound file.

The abovementioned sound source module is responsible for collecting sound of all kinds of musical instruments, sound edited by different software, accompaniment files, etc., and forming sound sources, and then sets up a timbre database. This is similar to ordinary digital pianos.

The abovementioned solfège keyboard includes a control unit, a key selector, a temperament selector, a timbre selector, a screen, multiple solfège key sets and other function keys. The control unit controls the overall work of the solfège keyboard according to the inputs of the key selector, the temperament selector, the timbre selector, and multiple solfège key sets. The key selector can provide discrete keys to choose, such as 1=C, 1=D, or set the key to an arbitrary frequency. The temperament selector is used to select the temperament, for example, the twelve-tone equal temperament, the temperament based on the five-element theory, just intonation, etc. The timbre selector is to select the timbre, such as violin, trumpet, etc. The screen can display all the information of key, temperament, and timbre. The screen can also be a touch screen which integrates the key selector, the temperament selector, and the timbre selector. The multiple solfège key sets are several sets of piano keys with different pitches. Other function keys are for expanding the functionality of the solfège keyboard, such as adding accompaniment.

The abovementioned key selector can be compatible with an ordinary piano and provide twelve discrete keys, for example 1=C or 1=D. It can also have continuous keys, for example, 1=f Hz (f is an arbitrary frequency that can be supported by the apparatus). The key selector has a function to test the frequency of a person's voice and set the key accordingly, which can make the apparatus match the voice of people and avoid the effort in finding the key. The key can also be set automatically through reading a piece (written in the numbered musical notation, the staff notation, or the color graphic vector numbered musical notation) and the key can vary during playing.

The abovementioned solfège key set includes seven solfège keys based on the seven solfège syllables and several auxiliary keys. The seven solfège keys are always main keys and have a fixed one-to-one correspondence to the solfège digits with corresponding pitches in the numbered musical notation no matter what key is chosen. For example, the seven solfège keys in the solfège key set of the middle octave have a one-to-one correspondence to "1, 2, 3, 4, 5, 6, 7" in the numbered musical notation. The auxiliary keys are designed to supplement some tones and are not main keys, so they are pressed with small chance and can be made with a relatively small size. In contrast, for ordinary pianos, both white keys and black keys could be main keys and might be pressed frequently, therefore both of them are designed with a relatively large size. For the middle octave, the seven white keys are named "C, D, E, F, G, A, B" and the five black keys are named "C#, D#, F#, G#, A#". When the key is the F# major scale, the seven notes "F#, G#, A#, B, C#, D#, F" correspond to "1, 2, 3, 4, 5, 6, 7" in the numbered musical notation, respectively. Then in this case, five black keys are played as the main keys.

In the abovementioned solfège key set, since the size of auxiliary keys is relatively small, solfège keys can be designed relatively narrow so as to make the keyboard more compact. The size of piano keys can also be designed according to players, for example, piano keys can be a little larger for adults and a little smaller for children.

In the abovementioned solfège key set, the number of auxiliary keys can be 1, 2, or more. When the number of auxiliary keys is 1, a solfège key set includes 8 piano keys. When the number of auxiliary keys is 5, the apparatus is compatible with ordinary pianos.

There is a gap between the abovementioned solfège keys. Press down the corresponding solfège key to play a musical note. The solfège key can also be kneaded at the time of being pressed down to slightly adjust the frequency of the sound. These functions are realized by pressure sensors and angle sensors. The pressure sensors detect if any piano key is pressed down and the angle sensors detect the angle change of the piano key that is kneaded so as to slightly adjust the pitch (frequency) of that piano key during playing.

The abovementioned solfège keys can have apparent signs to represent their corresponding solfège, for example, labeling the piano keys with their corresponding solfège digits. Each solfège digit can be placed in a frame. To distinguish different solfège key sets, the frames are filled with the same color if they belong to the same solfège key set and with different colors if not. Therefore, the solfège digits in the same solfège key set have the same background color and the solfège digits in different solfège key sets have different background colors. Auxiliary keys can also have apparent signs to represent their pronunciation and the shape and size of auxiliary keys can be different from solfège keys.

The working process of the abovementioned solfège keyboard is as follows. First, the control unit sends the timbre sequence number to the timbre database of the sound source module according to the choice of the timbre selector and then provides the sound source file with the corresponding timbre sequence number to the key-temperament-timbre adjustment module. Secondly, the control unit configures the frequencies of all the solfège keys and auxiliary keys according to the choice of the key selector and the temperament selector and sends the frequency information to the key-temperament-timbre adjustment module. During playing, the key and temperament can be changed through the key selector and the temperament selector and the control unit can send the new frequencies of all the solfège keys and auxiliary keys to the key-temperament-timbre adjustment module in real time. The pressure sensors detect which solfège keys or auxiliary keys are pressed and acquire the duration and strength of pressing. Through the control unit, these information is sent to the key-temperament-timbre adjustment module to decide which musical notes are played and what the duration and strength are. The angle sensors acquire the angle change of solfège keys that are kneaded. Through the control unit, these information is sent to the key-temperament-timbre adjustment module to slightly adjust the frequencies of solfège keys in real time.

The abovementioned key-temperament-timbre adjustment module selects the corresponding sound source file according to available sound source files provided by the timbre database, the frequencies of all the solfège keys and auxiliary keys, real-time detection of whether a piano key is pressed and the duration, strength, and angle of pressing. Then the key-temperament-timbre adjustment module processes the selected sound source file and generates a new sound source file.

The abovementioned processing carried out by the key-temperament-timbre adjustment module includes the following adjustments. Adjust the duration of the sound in the selected sound source file according to the duration of pressing the piano key. When the duration of the sound in the sound source file is not equal to the duration of pressing the piano key, lengthen or shorten the duration of the sound accordingly. Adjust the amplitude of the sound in the selected sound source file according to the strength of pressing the piano key. If the strength of pressing the piano key is strong, increase the amplitude of the sound; otherwise, decrease the amplitude of the sound. Adjust the frequency of the sound in the selected sound source file according to the frequencies of all the solfège keys and auxiliary keys and the angle change of the piano key that is kneaded. For example, if the frequency of the solfège key being pressed is 420 Hz and this solfège key is kneaded at the same time with an angle change of clockwise 30 degrees (representing increasing the frequency by 10 Hz), then the frequency of the sound in the sound source file is increased to 430 Hz.

The abovementioned sound play module is responsible for playing the new sound source file generated by the key-temperament-timbre adjustment module after the processing.

A color graphic vector numbered musical notation includes descriptions and musical notes. The descriptions include a key signature description, a beat unit description, and a beat count description. These descriptions are usually shown at the beginning of a piece, just below the title.

The abovementioned key signature description adopts the same format as that in the numbered musical notation. For example, 1=D represents that the key is the D major scale. Since the digital sight-singing piano in the present invention can have other keys besides the traditional twelve keys, the key signature description can also describe the pitch of "do" more precisely. If the frequency of "do" is f Hz, where f can be an arbitrary frequency within the supported frequency range, then the key signature description is described as 1=f Hz.

The abovementioned beat unit description defines the beat unit. It is illustrated graphically, like $$\square = x,$$

where the rectangle frame is referred to as the notation frame. In the beat unit description, x can be a fraction, such as ¼ and ⅛, which mean that a quarter note counts as one beat and an eighth note counts as one beat, respectively, and x can also be a period of time, such as 1 ms, which means that the duration of one beat is 1 ms. Therefore, the beat unit description can describe tempo precisely. In contrast, tempo in the staff notation and the numbered musical notation is described using some terms like Adagio, Moderato, Allegro, etc. and the description is pretty general.

The abovementioned beat count description is illustrated as $$|\underset{N}{\square\ \square\ \ldots\ \ldots\ \square\ \square}|,$$

which means N notation frames per bar, i.e., N beats per bar.

The beat unit description and beat count description are combined together and can describe the time signature in the numbered musical notation more intuitively. For example, $$|\square\ \square|, \square = \frac{1}{4}$$

represents two quarter-note beats per bar, which is described by 2/4 in the numbered musical notation and means that a quarter note counts as one beat and there are two beats per bar. Another example is $$|\square\ \square\ \square\ \square|, \square = \frac{1}{4}.$$

It represents four quarter-note beats per bar, which is described by 4/4 in the numbered musical notation and means that a quarter note counts as one beat and there are four beats per bar. In this case, since both numerator and denominator are 4, it is easy to confuse their meaning. In contrast, the beat unit description and beat count description of the color graphic vector numbered musical notation is much clearer.

In the color graphic vector numbered musical notation, musical notes are shown after the descriptions. The musical notes are divided by bars. A bar is a segment of time corresponding to a specific number of beats, where the boundaries of the bar are indicated by vertical bar lines. The number of beats per bar equals the number of notation frames in the beat count description. Each notation frame represents one beat. The musical note is placed in the notation frame.

The abovementioned notation frame has fixed height and width, which corresponds to a fixed duration. No matter how many musical notes are put into the notation frame, its width remains unchanged. Therefore the color graphic vector numbered musical notation looks very ordered. If multiple musical notes are played at the same time, their notation frames are aligned vertically, i.e., one beneath the other, from the low pitch to high pitch (or the other way).

The abovementioned musical notes include the extended solfège set "1, 1⁺, 2, 2⁺, 3, 4, 4⁺, 5, 5⁺, 6, 6⁺, 7", the hold note "–" (or "=", or "《《"), and the rest note "0". The extended solfège set has a one-to-one correspondence to the twelve piano keys in one octave. Since being extended from the solfège digits in the numbered musical notation, "1⁺, 2⁺, 4⁺, 5⁺, 6⁺" are called extended solfège digits and they correspond to the five black keys in one octave. Dots above or below (an alternative choice is on the right or left side of) a musical note raise or lower it to other octaves. The number of dots equals the number of octaves. The dots can be aligned like a pyramid, which saves space and is easy to see. For example, represent musical notes in different octaves. It is worth noting that the extended solfège digits "1⁺, 2⁺, 4⁺, 5⁺, 6⁺" can also be designed as "2⁻, 3⁻, 5⁻, 6⁻, 7⁻", or other preferred formats.

Each notation frame can contain M musical notes, which means the duration of one beat is divided into M parts equally. For example, if there are 3 musical notes in one notation frame, the duration is divided into 3 parts equally. If there are 4 musical notes, the duration is divided into 4 parts equally.

If a notation frame could not accommodate all the musical notes that need to be placed in it, use annotation. For example, if four musical notes "1, 2, 3, 4" need to be placed in one notation frame, let it be $Y_1$ and use annotation $Y_1=1234$. The annotation should not appear frequently, otherwise the beat unit should be redefined by reducing the value of the beat unit or increasing the number of notation frames. For example, change the value of the beat unit from 128 ms to 64 ms or use $$\square\square = \frac{1}{4}$$

instead of $$\square = \frac{1}{4}.$$

If the musical notes in the notation frame are bold, then the corresponding piano keys should be pressed strongly.

Each musical note in a notation frame corresponds to a solfège key in a solfège key set. The musical note in a notation frame should have the same background color as that of the solfège digit labeled on the corresponding solfège key.

The key signature description, beat unit description, and beat count description are described at the beginning of a piece. If any of the key, beat unit or beat count changes during playing, the corresponding description should be described again before the change.

The color graphic vector numbered musical notation can be displayed on paper or on an electronic screen. When used during playing, the electronic screen provides an electronic scrolling display and shows the musical notes in real time. A line is also shown on the electronic screen, indicating which musical notes to play at the moment. This line is referred to as the playing indication line.

The color graphic vector numbered musical notation has multiple types for choosing. For example:

1) Compact type: The color graphic vector numbered musical notation in this type is similar to the numbered musical notation, but easier to read.

2) Function type: The musical notes in this type can be categorized into the male voice part and the female voice part, or the low voice part and the high voice part, or the theme and the chord, or the left hand playing part and the right hand playing part. Then the musical notes in different categories are arranged into two or more lines.

3) Finger type: The color graphic vector numbered musical notation can be combined with the piano fingering. In this type, the musical notes are arranged into ten horizontal or vertical lines. For example, in the horizontal display, the top five lines represent the five fingers of the right hand and the bottom five lines represent the five fingers of the left hand. Place the musical notes that are played by a certain finger on the corresponding line. By adding piano fingering into the musical notation, sight singing and playing can be easily combined.

4) Rotation type: In this type, the color graphic vector numbered musical notation can be displayed at different angles. Without rotation, the musical notes are displayed horizontally and the playing indication line is a vertical line. During playing, the playing indication line is moving to the right and the musical notes are scrolling to the left. When the color graphic vector numbered musical notation is rotated clockwise by 90 degrees, the musical notes are displayed vertically and the playing indication line is a horizontal line. During playing, the playing indication line is moving downward and the musical notes are scrolling upward. When the color graphic vector numbered musical notation is rotated clockwise by 270 degrees, the musical notes are displayed vertically and the playing indication line is a horizontal line. During playing, the playing indication line is moving upward and the musical notes are scrolling downward. Moreover, the color graphic vector numbered musical notation can be rotated by any degree, or even displayed in 3D, which enhances interaction and entertainment.

The above types can be used individually or combined. For example, the finger type can be combined with the rotation type and displayed at a preferred angle.

In summary, the color graphic vector numbered musical notation uses extended solfège to describe pitch (similar as the numbered musical notation), different colors to indicate the positions of the piano keys to press, notation frames with fixed width to represent the beat unit, font (i.e. bold or not) of musical notes to show the strength of pressing piano keys, so it can offer multi-dimension playing information. Since this notation method is based on the numbered musical notation and provides multi-dimension information using color and graph, it is named the color graphic vector numbered musical notation. The color graphic vector numbered musical notation can be combined with the apparatus in this invention or used separately. For example, it can be combined with ordinary pianos.

The beneficial effect of the invention is as follows.

1. The seven solfège keys of a solfège key set on the solfège keyboard have a fixed one-to-one correspondence to the solfège digits with corresponding pitches in the numbered musical notation regardless of the key. For example, the seven solfège keys in the solfège key set of the middle octave have a fixed one-to-one correspondence to "1, 2, 3, 4, 5, 6, 7" in the numbered musical notation. Then it is much easier to find which piano keys to press.

2. Compared with ordinary pianos, which only support limited and fixed keys, the apparatus in this invention can have continuous and arbitrary keys. It can also test the frequency of a person's voice and set the key accordingly so as to make the key match the voice.

3. In this invention, the key can be set manually so as to be compatible with the twelve traditional keys or be set automatically through reading a piece (written in the numbered musical notation, the staff notation, or the color graphic vector numbered musical notation) where the key can vary during playing.

4. In this invention, a solfège key on the solfège keyboard can be pressed down to play a musical note or be kneaded at the time of being pressed down to adjust the pitch (frequency) of the piano key slightly. Then the player can be provided more room for creation.

5. In this invention, a solfège key set includes solfège keys and auxiliary keys, similar to white keys and black keys of ordinary pianos. However, for ordinary pianos, both white keys and black keys could be main keys and pressed frequently, so both of them are designed with a relatively large size. In contrast, the auxiliary keys of this invention are not main keys. They are set to supplement some tones and are pressed with small chance, therefore they are made relatively small. Since the auxiliary keys are relatively small, solfège keys can be designed relatively narrow so as to make the keyboard more compact. The size of piano keys can also be designed according to players, for example, piano keys can be a little larger for adults and a little smaller for children.

6. The color graphic vector numbered musical notation provides multi-dimension playing information using color and graph and is easy to read. It uses extended solfège to describe pitch (similar as the numbered musical notation), different colors to indicate the positions of the piano keys to press, notation frames with fixed width to represent the beat unit, and font (i.e. bold or not) of musical notes to show the strength of pressing piano keys. With the color graphic vector numbered musical notation, the strength and duration of pressing piano keys are more controllable and it is much easier to locate the piano keys to press. The color graphic vector numbered musical notation is also suitable for computer-aided notation.

7. The notation frame of the color graphic vector numbered musical notation has fixed height and width. No matter how many musical notes are put into the notation frame, its width remains unchanged. Therefore each bar also has fixed width which makes the color graphic vector numbered musical notation look very ordered and easy to read. This can facilitate sight singing and rhythm control.

8. When the number of auxiliary keys is set to 5, the solfège keyboard is compatible with ordinary pianos. The twelve solfège digits in an extended solfège set of the color graphic vector numbered musical notation have a fixed one-to-one correspondence to the twelve piano keys in the corresponding octave of the solfège keyboard regardless of the key. This can help beginners memorize the positions of piano keys.

9. The color graphic vector numbered musical notation combines the advantages of the numbered musical notation and the staff notation. It is not only suitable for playing, but also good for sight singing. Moreover, it provides multiple types for display and can combine piano fingering with the musical notation, which makes it no longer difficult to learn to play the piano.

DETAILED DESCRIPTION OF THE PREFERRED EMBODIMENTS

Figure 1:
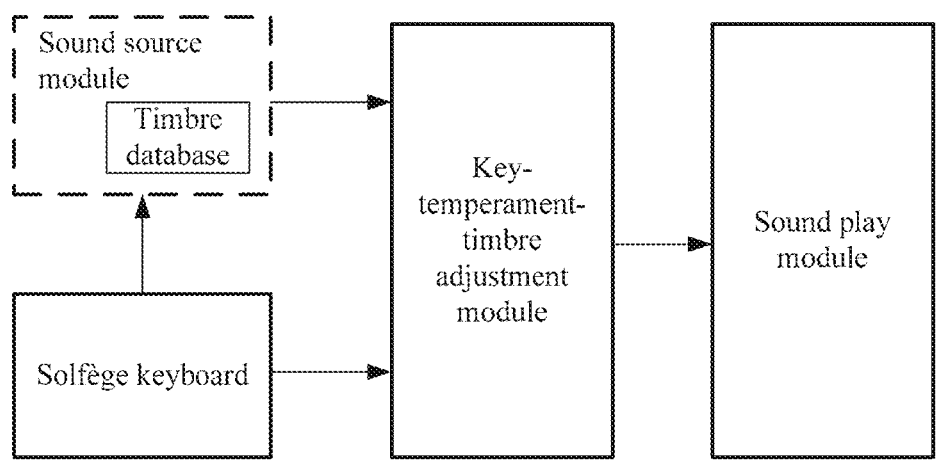
FIG. 1 is a block diagram of a digital sight-singing piano according to embodiments of the invention.

FIG. 1 illustrates a block diagram of a digital sight-singing piano according to embodiments of the invention. As shown in FIG. 1, a digital sight-singing piano includes a sound source module, a solfège keyboard, a key-temperament-timbre adjustment module, and a sound play module. The sound source module is responsible for collecting and storing sound sources of all kinds of musical instruments and sets up a sound source database. The solfège keyboard sends instructions to the sound source module and the key-temperament-timbre adjustment module according to the buttons pressed. The key-temperament-timbre adjustment module edits the sound source and generates a new sound file according to the received instructions. The sound play module is responsible for playing the sound file.

Figure 2:
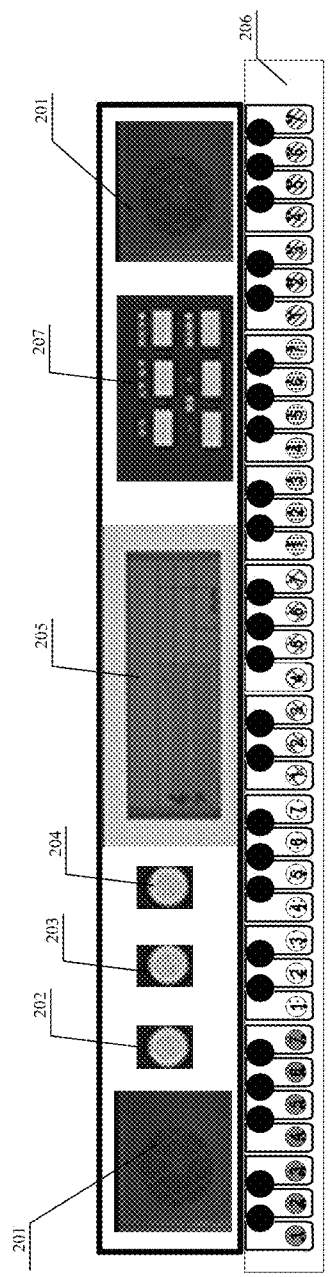
FIG. 2 illustrates an exemplary digital sight-singing piano according to embodiments of the invention.

FIG. 2 illustrates an exemplary digital sight-singing piano according to embodiments of the invention. The control unit of the solfège keyboard, the sound source module and the key-temperament-timbre adjustment module are integrated using DSP or ARM and put inside the piano, so they are not labeled in FIG. 2. The sound play module is realized by speakers 201. The solfège keyboard also includes a timbre selector 202, a temperament selector 203, a key selector 204, a screen 205, multiple solfège key sets 206 and other function keys 207. The timbre selector 202 is to select the timbre, such as violin, trumpet, etc. The temperament selector 203 is used to select the temperament, for example, the twelve-tone equal temperament, the temperament based on the five-element theory, just intonation, etc. The key selector 204 can provide discrete keys to choose, for example, 1=C, 1=D, or set the key to an arbitrary frequency. The screen 205 can display all the information of key, temperament, and timbre or be a touch screen which integrates the key selector, the temperament selector, and the timbre selector. In FIG. 2, the number of solfège key sets is 5.

The abovementioned key selector can be compatible with an ordinary piano and provide twelve discrete keys, for example 1=C or 1=D. It can also have continuous keys, for example, 1=f Hz (f is an arbitrary frequency that can be supported by the apparatus). The key selector can make the apparatus match the voice of people and avoid the effort in finding the key. One of function keys 207 is to test the frequency of a person's voice and set the key accordingly. The key can also be set automatically through reading a piece (written in the numbered musical notation, the staff notation, or the color graphic vector numbered musical notation) and the key can vary during playing.

Figure 3:
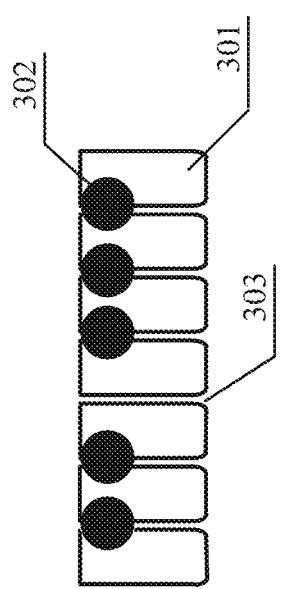
FIG. 3(a) illustrates an exemplary solfège key set according to embodiments of the invention.
FIG. 3(b) illustrates five solfège key sets according to embodiments of the invention.
Figure 3:

FIG. 3(a) illustrates an exemplary solfège key set according to embodiments of the invention. The exemplary solfège key set includes 7 solfège keys 301 and 5 auxiliary keys 302. There is a gap 303 between two solfège keys. The solfège keys can be pressed down to play a musical note. They can also be kneaded at the time of being pressed down to slightly adjust the frequency of the piano key. These functions can be realized by pressure sensors and angle sensors. The pressure sensors detect if any piano key is pressed and the angle sensors detect the angle change of the piano key that is kneaded. The seven solfège keys are main keys. If the exemplary solfège key set is in the middle octave, then its seven solfège keys have a fixed one-to-one correspondence to "1, 2, 3, 4, 5, 6, 7" in the numbered musical notation no matter what key is chosen. The auxiliary keys are not main keys and they are designed to supplement some tones. Therefore they are pressed with small chance and can be made with a relatively small size. In the exemplary solfège key set, the five auxiliary keys are small dots and they correspond to extended solfège digits "1+, 2+, 4+, 5+, 6+", respectively. Since the auxiliary keys are relatively small, solfège keys can be designed relatively narrow so as to make the keyboard more compact. The size of piano keys can also be designed according to players, for example, piano keys can be a little larger for adults and a little smaller for children.

FIG. 3(b) illustrates five solfège key sets according to embodiments of the invention. The solfège keys can have apparent signs to represent their corresponding solfège. In FIG. 3(b), they are labeled with corresponding solfège digits. Each solfège digit is placed in a frame. To distinguish different solfège key sets, the frames are filled with the same color if they belong to the same solfège key set and with different colors if not. In FIG. 3(b), different patterns represent different colors. Therefore, the solfège digits in the same solfège key set have the same background pattern and the solfège digits in different solfège key sets have different background patterns. Auxiliary keys can also have apparent signs to represent their pronunciation and the shape and size of auxiliary keys can be different from solfège keys. In FIG. 3(b), auxiliary keys are round and have no labels. Dots above or below a solfège digit raise or lower it to other octaves. The dots can be aligned like a pyramid to save space and the number of dots equals the number of octaves. Since FIG. 3(b) only shows five solfège key sets, the solfège digits with the highest pitch and lowest pitch in FIG. 3(b) are respectively. Solfège digits with higher and lower pitches can be represented by etc. The color graphic vector numbered musical notation also adopts this representation for musical notes in different octaves.

FIG. 4(a) is a schematic of the color graphic vector numbered musical notation of Silent Night according to embodiments of the invention. FIG. 4(b) is a schematic of the numbered musical notation of Silent Night. A color graphic vector numbered musical notation includes descriptions and musical notes. The descriptions include a key signature description, a beat unit description, and a beat count description. These descriptions are usually shown at the beginning, just below the title Silent Night. In FIG. 4(b), 1=C 401 is the key signature description, which means that the key is the C major scale. For the middle octave, the seven white keys "C, D, E, F, G, A, B" correspond to "1, 2, 3, 4, 5, 6, 7", respectively. The graph $$|\square\square\square\square\square\square|402$$

is the beat count description, which contains 6 notation frames and indicates 6 beats per par. The graph $$\square = \frac{1}{8} \ 403$$

is the beat unit description, which means that an eighth note counts as one beat. The key signature description, beat unit description, and beat count description are described at the beginning of a piece. If any of the key, beat unit or beat count changes during playing, the corresponding description should be described again before the change.

Figure 4:
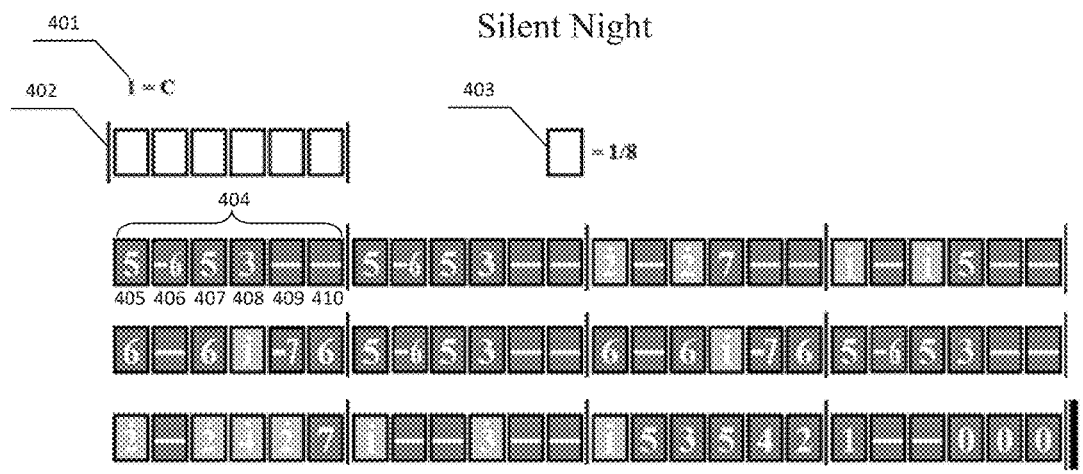
FIG. 4(a) is a schematic of the color graphic vector numbered musical notation of Silent Night according to embodiments of the invention.
FIG. 4(b) is a schematic of the numbered musical notation of Silent Night.
FIG. 4(c) illustrates the case when multiple musical notes need to be placed in one notation frame.
FIG. 4(d) is a schematic of the color graphic vector numbered musical notation of a segment of 500 Miles according to embodiments of the invention.
FIG. 4(e) is a schematic of the numbered musical notation of a segment of 500 Miles.
Figure 4:
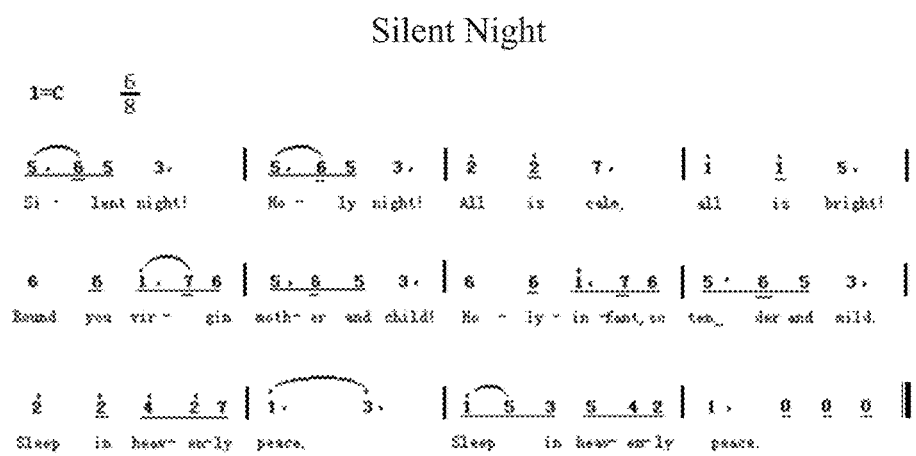
Figure 4:
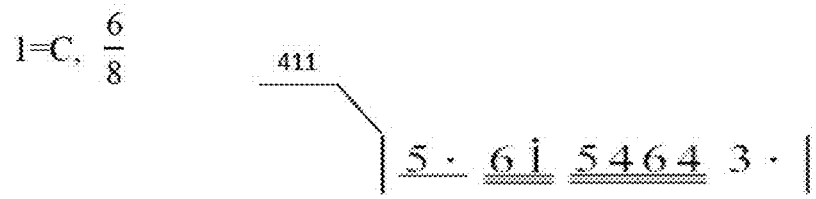
Figure 4:
Figure 4:
Figure 4:
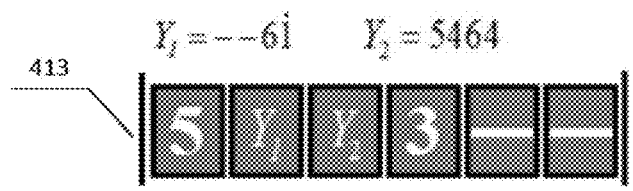
Figure 4:
Figure 4:
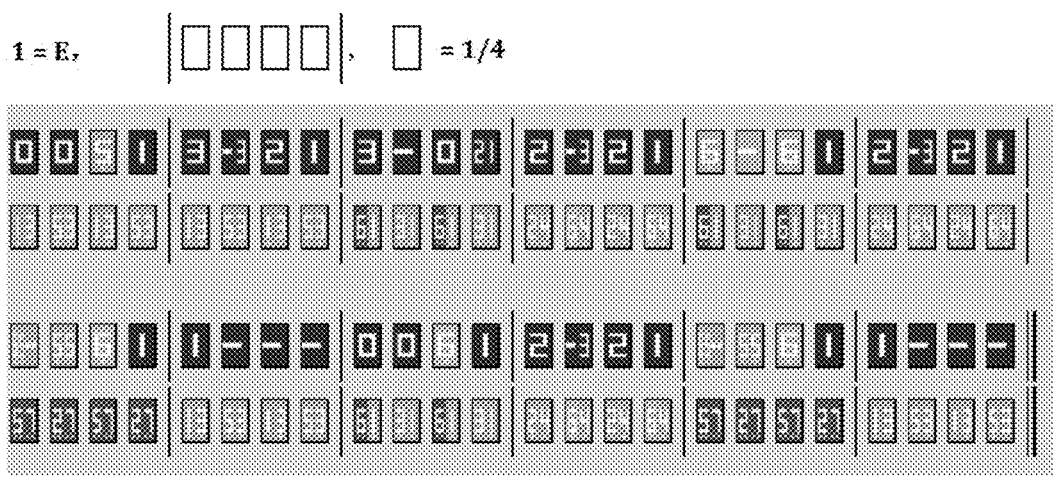
Figure 4:
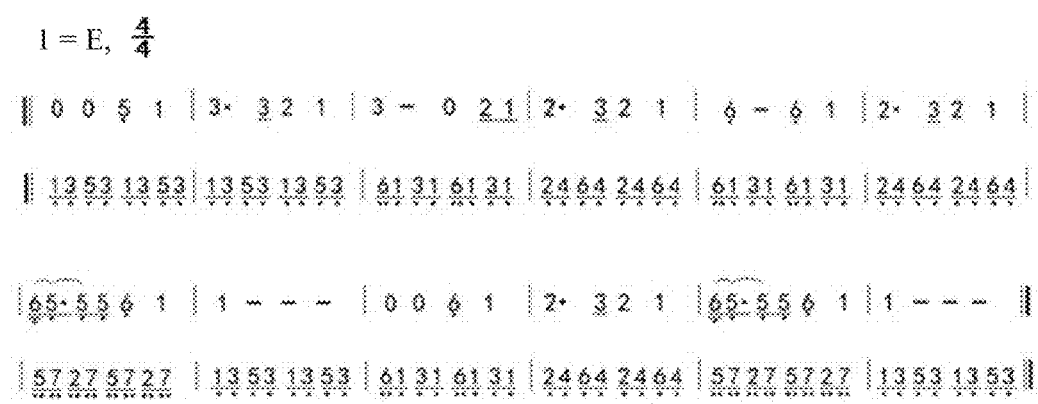

The color graphic vector numbered musical notation divides musical notes by bars. The number of beats per bar equals the number of notation frames in the beat count description. Musical notes include the extended solfège set "1, 1+, 2, 2+, 3, 4, 4+, 5, 5+, 6, 6+, 7", the hold note "-" (or "=", or "《《"), and the rest note "0". If multiple musical notes are played at the same time, their notation frames are aligned vertically, i.e., one beneath the other, from the low pitch to high pitch (or the other way). Musical notes are placed in the notation frames. Each notation frame can contain M musical notes, which means the duration of one beat is divided into M parts equally. For example, if there are 3 musical notes in one notation frame, the duration of one beat is divided into 3 parts equally and each musical note lasts for ⅓ of the duration of one beat; if there are 4 solfège digits and one hold note in one notation frame, the duration of one beat is divided into 5 parts equally and each musical note lasts for ⅕ of the duration of one beat. As shown in FIG. 4(a), each bar has 6 notation frames 405-410, corresponding to 6 beats. Musical notes "5", "-6", "5", "3", "-", and "-" are placed in 405-410, respectively. Each lasts for one beat, which equals an eighth note. Notation frames 405,

407, 408 contain one musical note each, which lasts for one beat. Notation frame 406 contains two musical notes, "–" and "6", where each of them lasts for half of a beat, i.e., a sixteenth note. Notation frames 409 and 410 both contain the hold note "–", representing that the preceding musical note "3" should last for two more beats. Other bars are described similarly. Compared with FIG. 4(*b*), notation frames of the color graphic vector numbered musical notation have fixed height and width and no matter how many musical notes are put into the notation frame, its width remains unchanged, which makes the color graphic vector numbered musical notation look very neat and ordered. In FIG. 4(*a*), musical notes of Silent Night are arranged in 3 lines and each line has 4 bars. Since each line and each bar has fixed width, it is easy to read. Moreover, if a musical note in a notation frame is played by pressing a solfège key in a solfège key set, then this musical note should have the same background color as that of the solfège digit labeled on the corresponding solfège key. In FIG. 4(*a*), solfège digits in the higher octave have light background to differ from those in the middle octave. Therefore, the color graphic vector numbered musical notation enhances readability and facilitates sight singing and rhythm control. In addition, it is closely related to piano keys and makes it easy to locate piano keys to press.

In FIG. 4(*a*), several musical notes are in the higher octave, such as Dots above or below a musical note raise or lower it to other octaves. The number of dots equals the number of octaves. An alternative choice is to put dots on the right or left side of a musical note to raise or lower it to other octaves. The dots can be aligned like a pyramid, which saves space and is easy to see.

FIG. 4(*c*) illustrates the case when multiple musical notes need to be placed in one notation frame. Annotation is adopted if a notation frame could not accommodate all the musical notes that need to be placed in it or the musical notes become very small after being placed in one notation frame. For example, when musical notes in the numbered musical notation 411 are converted to the color graphic vector numbered musical notation 412, among six notation frames, two notation frames need to accommodate 4 musical notes each. After 4 musical notes are placed in one notation frame, they become very small. In this case, annotation 413 is adopted. The annotation should not appear frequently, otherwise the beat unit description should be redefined by reducing the value of the beat unit, such as from 128 ms to 64 ms or from ¼ to ⅛, or increasing the number of notation frames. In FIG. 4(*c*), the beat unit description is redefined by adding one more notation frame as in 414. Then the beat unit is reduced to ½ of the original value and the color graphic vector numbered musical notation is transformed to 415 accordingly, which contains 12 notation frames. If the beat unit is reduced to ¼ of the original value, then the beat unit description should be redefined by adding 3 notation frames. Similarly, if the beat unit is reduced to $½^n$ of the original value, then the beat unit description should be redefined by adding $2^n-1$ notation frames.

FIG. 4(*d*) is a schematic of the color graphic vector numbered musical notation of a segment of 500 Miles, where the key is the E major scale and the time signature is 4/4. FIG. 4(*e*) is a schematic of the numbered musical notation of the same segment. This segment contains musical notes in three octaves, i.e., the middle octave, lower octave, and double lower octave, which are illustrated by filling the corresponding notation frames with different gray scales. Musical notes on the top line and bottom line are played with the right hand and the left hand, respectively. Compared with the numbered musical notation in FIG. 4(*e*), the color graphic vector numbered musical notation in FIG. 4(*d*) is much easier to read.

Figure 5:
FIG. 5(a) illustrates an exemplary representation of an extended solfège set of the color graphic vector numbered musical notation.
FIG. 5(b) illustrates the solfège key set of the middle octave labeled with corresponding solfège digits in FIG. 5(a)
Figure 5:
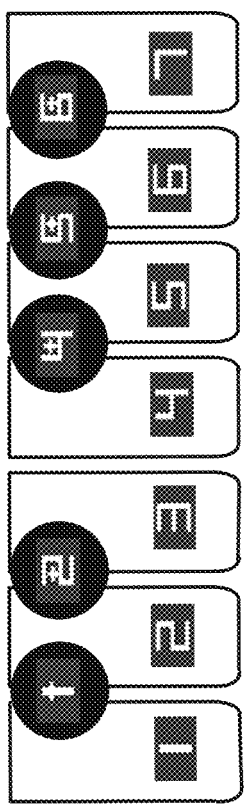

FIG. 5(*a*) illustrates an exemplary representation of an extended solfège set of the color graphic vector numbered musical notation. The extended solfège digits "$1^+$, $2^+$, $4^+$, $5^+$, $6^+$" in an extended solfège set "1, $1^+$, 2, $2^+$, 3, 4, $4^+$, 5, $5^+$, 6, $6^+$, 7" can also be designed as "$2^-$, $3^-$, $5^-$, $6^-$, $7^-$", or other preferred formats. The representation in FIG. 5(*a*) is very compact and can save space when the solfège digits in this representation are labeled on the solfège keys as shown in FIG. 5(*b*).

Figure 6:
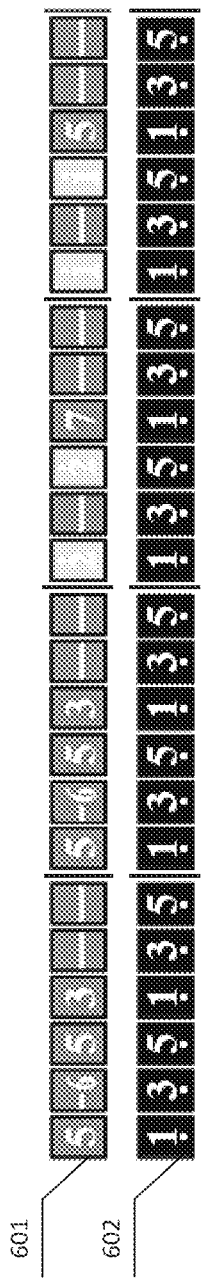
FIG. 6(a) is a schematic of the color graphic vector numbered musical notation in the function type.
FIG. 6(b) is a schematic of the color graphic vector numbered musical notation in the finger type.
Figure 6:
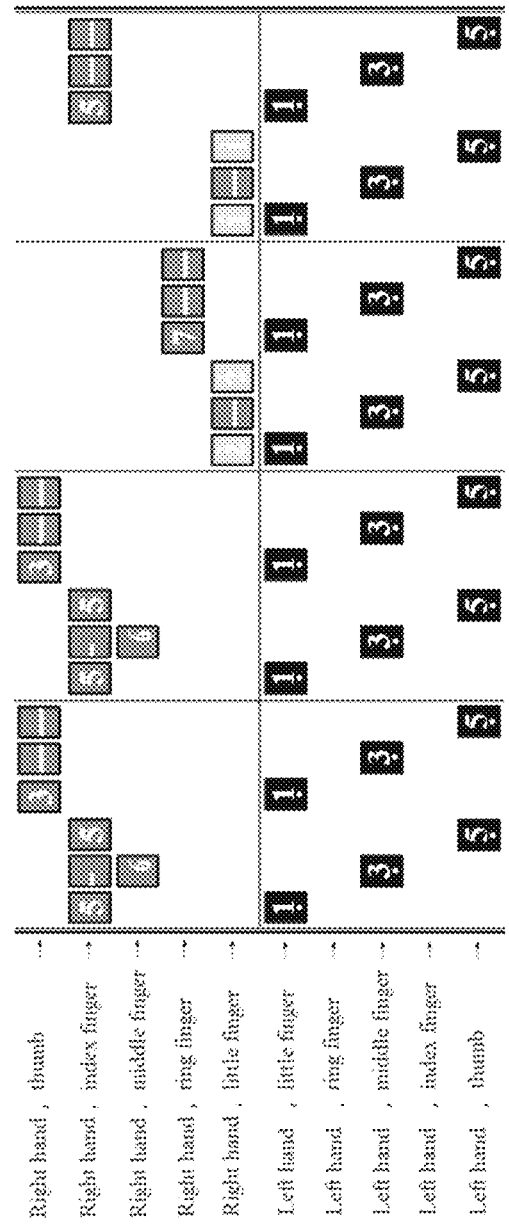

FIG. 6 shows the color graphic vector numbered musical notation in different types.

The color graphic vector numbered musical notation can be displayed on paper or on an electronic screen. When used during playing, the electronic screen provides an electronic scrolling display and shows the musical notes in real time. A line is also shown on the electronic screen, indicating which musical notes to play at the moment. This line is referred to as the playing indication line.

The color graphic vector numbered musical notation has multiple types for choosing.

1) Compact type: The color graphic vector numbered musical notation in this type is similar to the numbered musical notation, but easier to read. The color graphic vector numbered musical notation of Silent Night in FIG. 4(*a*) is in the compact type.

2) Function type: The musical notes in this type can be categorized into the male voice part and the female voice part, or the low voice part and the high voice part, or the theme and the chord, or the left hand playing part and the right hand playing part. Then the musical notes in different categories are arranged into two or more lines. In FIG. 6(*a*), the musical notes of a segment of Silent Night are categorized into the theme and the chord. The theme is the top line 601 and the chord is the bottom line 602. FIG. 6(*a*) can also be interpreted as categorizing the musical notes of this segment into the left hand playing part and the right hand playing part, where 601 is played by the right hand and 602 is played by the left hand.

3) Finger type: The color graphic vector numbered musical notation can be combined with the piano fingering. In this type, the musical notes are arranged into ten horizontal or vertical lines. For example, in the horizontal display, the top five lines represent the five fingers of the right hand and the bottom five lines represent the five fingers of the left hand. Place the musical notes that are played by a certain finger on the corresponding line. By adding piano fingering into the musical notation, sight singing and playing can be easily combined. FIG. 6(*b*) illustrates the color graphic vector numbered musical notation in the finger type for a segment of Silent Night. The musical notes that are played by a certain finger are placed on the corresponding line. For example, for the right hand, the thumb plays "3", the index finger plays "5", etc.; for the left hand, the thumb, the middle finger, and the little finger play "5", "3", "1", respectively, and other fingers do not need to play. If the color graphic vector numbered musical notation is displayed on an electronic screen, a playing indication line can be provided to indicate which musical notes to play at the moment. For the color graphic vector numbered musical notation in FIG. 6(*b*), the playing indication line should be a vertical line and move to the right during playing. When the playing indication line reaches a certain column, the musical notes on this column are played by the corresponding fingers.

4) Rotation type: In this type, the color graphic vector numbered musical notation can be displayed at different angles. Without rotation, the musical notes are displayed horizontally and the playing indication line is a vertical line. During playing, the playing indication line is moving to the right and the musical notes are scrolling to the left. When the color graphic vector numbered musical notation is rotated clockwise by 90 degrees, the musical notes are displayed vertically and the playing indication line is a horizontal line. During playing, the playing indication line is moving downward and the musical notes are scrolling upward. When the color graphic vector numbered musical notation is rotated clockwise by 270 degrees, the musical notes are displayed vertically and the playing indication line is a horizontal line. During playing, the playing indication line is moving upward and the musical notes are scrolling downward. Moreover, the color graphic vector numbered musical notation can be rotated by any degree, or even displayed in 3D, which enhances interaction and entertainment.

Figure 7:
FIG. 7 illustrates how to convert the staff notation to the color graphic vector numbered musical notation.
Figure 7:
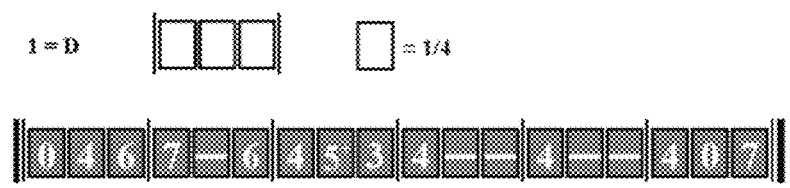

FIG. 7 illustrates how to convert the staff notation to the color graphic vector numbered musical notation. FIG. 7(a) is a segment of The Graduate in the staff notation. Convert the part 701 to the color graphic vector numbered musical notation, which is shown in FIG. 7(b). It can be seen that the extended solfège digit "5+" appears in this case.

Figure 8:
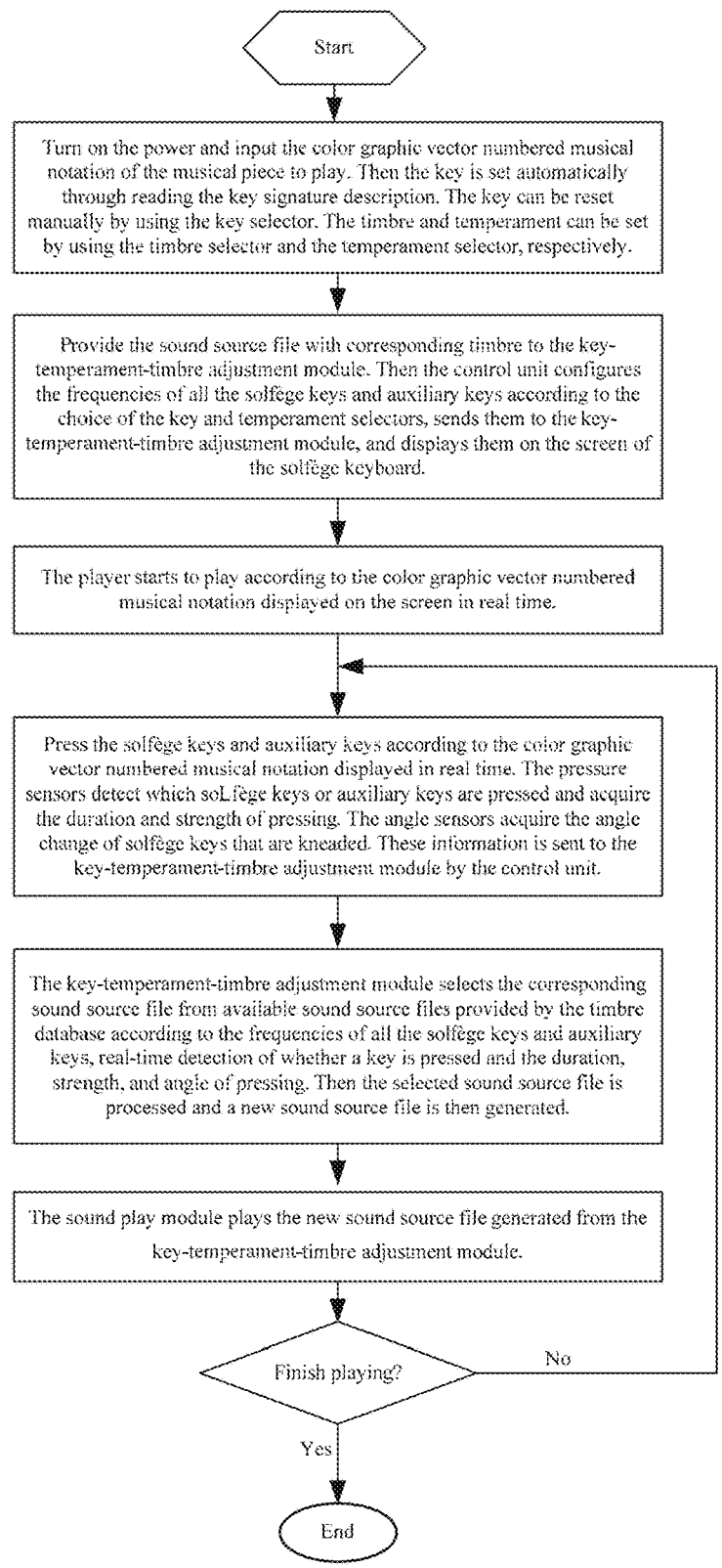
FIG. 8 is a flow diagram of playing a piece with the apparatus in the invention.

FIG. 8 is a flow diagram of playing a piece with the apparatus in the invention.

Step 1: The player turns on the power of the apparatus and inputs the color graphic vector numbered musical notation of the piece to play. Then the key is set automatically through reading the key signature description in the color graphic vector numbered musical notation. After that, if another key is preferred, the key can be reset manually by using the key selector. The timbre and temperament can be set by using the timbre selector and the temperament selector, respectively.

Step 2: According to the choice of the timbre selector, the control unit sends the timbre sequence number to the timbre database of the sound source module and then provides the sound source file with the corresponding sequence number to the key-temperament-timbre adjustment module. Then the control unit configures the frequencies of all the solfège keys and auxiliary keys according to the choice of the key selector and the temperament selector and sends the frequency information to the key-temperament-timbre adjustment module.

Step 3: The player plays the solfège keys and auxiliary keys according to the color graphic vector numbered musical notation displayed on the screen in real time. The pressure sensors detect which solfège keys or auxiliary keys are pressed and acquire the duration and strength of pressing. Through the control unit, these information is sent to the key-temperament-timbre adjustment module to decide which musical notes are played and what the duration and strength are. The angle sensors acquire the angle change of solfège keys that are kneaded. Through the control unit, these information is sent to the key-temperament-timbre adjustment module to slightly adjust the frequencies of solfège keys in real time.

Note that the key and temperament can be reset during playing through the key selector and the temperament selector, in which case the new frequencies of all the solfège keys and auxiliary keys are sent to the key-temperament-timbre adjustment module again in real time.

Step 4: The key-temperament-timbre adjustment module selects the corresponding sound source file from available sound source files provided by the timbre database according to the frequencies of all the solfège keys and auxiliary keys, real-time detection of whether a piano key is pressed and the duration, strength, and angle of pressing. Then the selected sound source file is processed and a new sound source file is then generated.

The above processing includes the following adjustments. Adjust the duration of the sound in the selected sound source file according to the duration of pressing the piano key. When the duration of the sound in the sound source file is not equal to the duration of pressing the piano key, lengthen or shorten the duration of the sound accordingly. Adjust the amplitude of the sound in the selected sound source file according to the strength of pressing the piano key. If the strength of pressing the piano key is strong, increase the amplitude of the sound; otherwise, decrease the amplitude of the sound. Adjust the frequency of the sound in the selected sound source file according to the frequencies of all the solfège keys and auxiliary keys and the angle change of the piano key that is kneaded. For example, if the frequency of the solfège key being pressed is 420 Hz and this solfège key is kneaded at the same time with an angle change of clockwise 30 degrees (representing increasing the frequency by 10 Hz), then the frequency of the sound in the sound source file is increased to 430 Hz.

Step 5: The sound play module plays the new sound source file generated by the key-temperament-timbre adjustment module. Repeat Step 3-Step 5 until all the musical notes in the color graphic vector numbered musical notation are played.

It is to be understood that various other adaptations and modifications can be made within the spirit and scope of the invention. Therefore, it is the object of the appended claims to cover all such variations and modifications as come within the true spirit and scope of the invention.

We claim:

1. A digital sight-singing piano with a fixed-solfège keyboard, continuous keys and adjustable tones by kneading piano keys, comprising
a sound source module that collects and stores sound sources of all kinds of musical instruments and sets up a sound source database;
a solfège keyboard that sends instructions to the sound source module and the key-temperament-timbre adjustment module according to the buttons pressed;
a key-temperament-timbre adjustment module that edits the sound source and generates a new sound file according to the received instructions; and
a sound play module that plays the sound file,
wherein the solfège keyboard includes
a key selector that enables the player to choose a discrete key or an arbitrary frequency within the frequency range as the key;
a temperament selector that enables the player to choose the temperament;
a timbre selector that enables the player to choose the timbre;
a control unit that controls the overall work of the solfège keyboard according to the inputs of the key selector, the temperament selector, and the timbre selector;
a screen that displays the information of key, temperament, and timbre, wherein the screen can also be a touch screen that integrates the key selector, the temperament selector, and the timbre selector;
multiple solfège key sets; and
other function keys.

2. The key selector of claim 1, wherein the key selector can provide twelve discrete keys that are compatible with an ordinary piano;
   wherein the key selector can also provide continuous keys by setting "1" to an arbitrary frequency that can be supported by the apparatus;
   wherein the key selector has means to test the frequency of a person's voice and set the key according to the frequency of the voice so as to make the digital piano match the voice of people and avoid the effort in finding the key;
   wherein the key can be set manually;
   wherein the key can also be set automatically through reading the notation of a piece; and
   wherein the key can vary during playing.

3. The solfège key set of claim 1, includes:
   seven solfège keys based on the seven solfège syllables; and
   several auxiliary keys,
   wherein the seven solfège keys are always main keys and have a fixed one-to-one correspondence to the solfège digits with corresponding pitches in the numbered musical notation no matter what key is chosen;
   wherein the auxiliary keys are not main keys and they are designed to supplement some tones;
   wherein the number of auxiliary keys can be 1, 2, or more and when the number of auxiliary keys is 5, the solfège key set is compatible with ordinary pianos;
   wherein the auxiliary keys are pressed with small chance and can be made with a relatively small size and thereby the solfège keys can be designed narrower so as to make the keyboard more compact;
   wherein the size of the piano keys can also be designed according to different players;
   wherein the solfège keys can have apparent signs to represent their corresponding solfège;
   wherein the solfège keys can be labeled with corresponding solfège digits and each solfège digit is placed in a frame;
   wherein the solfège digits in the same solfège key set have the same background color filled in the frames and the solfège digits in different solfège key sets have different background colors filled in the frames; and
   wherein the auxiliary keys can also have apparent signs to represent their pronunciation and the shape and size of auxiliary keys can be different from solfège keys.

4. The solfège keys of claim 3, wherein there is a gap between the solfège keys;
   wherein a solfège key can be pressed down to play a musical note by using pressure sensors to detect if a piano key is pressed; and
   wherein a solfège key can also be kneaded at the time of being pressed down to slightly adjust the frequency of the piano key by using angle sensors to detect the angle change of the piano key that is kneaded.

5. The digital sight-singing piano of claim 1, wherein the control unit sends the timbre sequence number to the timbre database of the sound source module according to the choice of the timbre selector and then provides the sound source file with the corresponding sequence number to the key-temperament-timbre adjustment module;
   wherein the control unit configures the frequencies of all the solfège keys and auxiliary keys according to the choice of the key selector and the temperament selector and sends the frequency information to the key-temperament-timbre adjustment module;
   wherein the key and temperament can be changed during playing through the key selector and the temperament selector and the control unit can send the new frequencies of all the solfège keys and auxiliary keys to the key-temperament-timbre adjustment module in real time;
   wherein the pressure sensors detect which solfège keys or auxiliary keys are pressed and acquire the duration and strength of pressing and these information is sent to the control unit and then transmitted to the key-temperament-timbre adjustment module for deciding which musical notes are played and what the duration and strength are;
   wherein the angle sensors acquire the angle change of solfège keys that are kneaded and these information is sent to the control unit and then transmitted to the key-temperament-timbre adjustment module for slightly adjusting the frequencies of solfège keys in real time;
   wherein the key-temperament-timbre adjustment module selects the corresponding sound source file according to available sound source files provided by the timbre database, the frequencies of all the solfège keys and auxiliary keys, real-time detection of whether a key is pressed and the duration, strength, and angle of pressing, and then processes the selected sound source file to generate a new sound source file;
   wherein the processing of the selected sound source file includes
   adjusting the duration of the sound in the sound source file according to the duration of pressing the piano key;
   adjusting the amplitude of the sound in the sound source file according to the strength of pressing the piano key; and
   adjusting the frequency of the sound in the sound source file according to the frequencies of all the solfège keys and auxiliary keys and the angle change of the piano key that is kneaded.

6. A color graphic vector numbered musical notation, comprising
   descriptions; and
   musical notes,
   wherein the descriptions include a key signature description, a beat unit description, and a beat count description;
   wherein the key signature description adopts the same format as that in the numbered musical notation;
   wherein the key signature description can describe the pitch of "do" more precisely and if the frequency of "do" is f Hz, then set 1=f Hz, where f is an arbitrary frequency that can be supported by the apparatus;
   wherein the beat unit description is illustrated as $$\square = x,$$

where the rectangle frame is referred to as the notation frame;
   wherein x can be a fraction or a period of time, representing the duration of one beat;
   wherein the beat count description is illustrated as $$\frac{|\square\ \square\ \ldots\ \ldots\ \square\ \square|}{N},$$

which means N notation frames per bar, i.e., N beats per bar;
wherein the key signature description, beat unit description, and beat count description are usually described at the beginning of a piece, just below the title; and
wherein the key signature description, beat unit description, and beat count description should be described again if any of the key, beat unit or beat count changes during playing.

7. The color graphic vector numbered musical notation of claim 6, wherein the musical notes are divided by bars;
wherein the number of beats per bar equals the number of notation frames in the beat count description and each notation frame represents one beat;
wherein the musical note is placed in the notation frame;
wherein the notation frame has fixed height and width, which corresponds to a fixed duration and no matter how many musical notes are put into the notation frame, the width of the notation frame remains unchanged, which makes the color graphic vector numbered musical notation look very ordered; and
wherein if multiple musical notes are played at the same time, their notation frames are aligned vertically, i.e., one beneath the other, from the low pitch to high pitch (or the other way).

8. The color graphic vector numbered musical notation of claim 6, wherein the musical notes include the extended solfège set "1, 1$^+$, 2, 2$^+$, 3, 4, 4$^+$, 5, 5$^+$, 6, 6$^+$, 7", the hold note "–" (or "=", or "《《"), and the rest note "0";
wherein the extended solfège set has a one-to-one correspondence to the twelve piano keys in one octave;
wherein since being extended from the solfège digits in the numbered musical notation, "1$^+$, 2$^+$, 4$^+$, 5$^+$, 6$^+$" are called extended solfège digits and they correspond to the five black keys in one octave;
wherein dots above or below (an alternative choice is on the right or left side of) a musical note raise or lower it to other octaves with the number of dots equal to the number of octaves and the dots can be aligned like a pyramid, which saves space and is easy to see;
wherein each notation frame can contain M musical notes, which means the duration of one beat is divided into M parts equally;
wherein if a notation frame could not accommodate all the musical notes that need to be placed in it, use annotation or redefine the beat unit, wherein the beat unit can be redefined by reducing the value of the beat unit or increasing the number of notation frames;
wherein if the musical notes in the notation frame are bold, the corresponding piano keys should be pressed strongly; and
wherein each musical note in a notation frame corresponds to a solfège key in a solfège key set and the musical note in a notation frame should have the same background color as that of the solfège digit labeled on the corresponding solfège key.

9. The color graphic vector numbered musical notation of claim 6, wherein the color graphic vector numbered musical notation can be displayed on paper or displayed on an electronic screen;
wherein when used during playing, the electronic screen provides an electronic scrolling display and shows the musical notes in real time and a playing indication line is also shown on the electronic screen, indicating which musical notes to play at the moment;
wherein the color graphic vector numbered musical notation can be shown in multiple types including:
compact type, wherein the color graphic vector numbered musical notation is similar to the numbered musical notation, but easier to read;
function type, wherein the musical notes can be categorized into the male voice part and the female voice part, or the low voice part and the high voice part, or the theme and the chord, or the left hand playing part and the right hand playing part and the musical notes in different categories can be arranged into two or more lines;
finger type, wherein the color graphic vector numbered musical notation can be combined with the piano fingering by using ten horizontal or vertical lines to represent ten fingers and placing the musical notes that are played by a certain finger on the corresponding line;
rotation type, wherein the color graphic vector numbered musical notation can be displayed at different angles including:
0 degree, wherein the musical notes are displayed horizontally with a vertical playing indication line and during playing, the playing indication line is moving to the right and the musical notes are scrolling to the left;
90 degrees, wherein the musical notes are displayed vertically with a horizontal playing indication line and during playing, the playing indication line is moving downward and the musical notes are scrolling upward;
270 degrees, wherein the musical notes are displayed vertically with a horizontal playing indication line and during playing, the playing indication line is moving upward and the musical notes are scrolling downward;
any degree, or even displayed in 3D, which enhances interaction and entertainment; and
wherein the above types can be used individually or combined.

* * * * *